(12) United States Patent
Corey (10) Patent No.: US 6,927,506 B2
(45) Date of Patent: Aug. 9, 2005

(54) LOW LOSS RECIPROCATING ELECTROMAGNETIC DEVICE

(75) Inventor: John A. Corey, Melrose, NY (US)

(73) Assignee: Clever Fellows Innovation Consortium, Troy, NY (US)

( * ) Notice: Subject to any disclaimer, the term of this patent is extended or adjusted under 35 U.S.C. 154(b) by 180 days.

(21) Appl. No.: 10/253,262

(22) Filed: Sep. 24, 2002

(65) Prior Publication Data

US 2003/0057780 A1 Mar. 27, 2003

Related U.S. Application Data

(60) Provisional application No. 60/324,842, filed on Sep. 25, 2001.

(51) Int. Cl.$^7$ .............................................. H02K 41/00
(52) U.S. Cl. ....................................................... 310/12
(58) Field of Search ............................. 310/12, 158.57, 310/192, 216, 256, 258, 260

(56) References Cited

U.S. PATENT DOCUMENTS

| | | | |
|---|---|---|---|
| 4,258,281 A | * 3/1981 | Calfo et al. ................. 310/256 |
| 4,349,757 A | 9/1982 | Bhate .......................... 360/15 |
| 4,602,174 A | 7/1986 | Redlich ........................ 310/15 |
| 5,139,242 A | 8/1992 | Yarr ............................ 267/160 |
| 5,146,123 A | 9/1992 | Yarr ............................ 310/15 |
| 5,315,190 A | 5/1994 | Nasar .......................... 310/12 |
| 5,389,844 A | 2/1995 | Yarr et al. .................... 310/15 |
| 5,654,596 A | * 8/1997 | Nasar et al. .................. 310/12 |
| 6,050,556 A | 4/2000 | Masuda et al. ............. 267/161 |
| 6,060,810 A | * 5/2000 | Lee et al. .................... 310/254 |
| 6,127,750 A | * 10/2000 | Dadd .......................... 310/13 |
| 6,229,231 B1 | * 5/2001 | Ishida et al. .................. 310/36 |
| 6,329,733 B1 | * 12/2001 | Katsumata et al. ........ 310/90.5 |
| 6,369,687 B1 | * 4/2002 | Akita et al. ................. 336/234 |
| 6,417,583 B1 | * 7/2002 | Okada ......................... 310/12 |

* cited by examiner

Primary Examiner—Thanh Lam
Assistant Examiner—Judson H. Jones
(74) Attorney, Agent, or Firm—Spencer K. Warnick; Hoffman, Warnick & D'Alessandro LLC

(57) ABSTRACT

The present invention relates generally to reciprocating electromagnetic devices, and more particularly to a construction of a reciprocating electromagnetic device for reducing secondary losses in magnetically-permeable elements, but without compromising manufacturability as required in prior art. The device provides for shaped pole faces to reduce local magnetic flux density and/or interruptions of electrically-conductive paths in the planes of the laminated layers of the stationary element of the device.

28 Claims, 10 Drawing Sheets

LOW LOSS RECIPROCATING ELECTROMAGNETIC DEVICE

REFERENCE TO PRIOR APPLICATION

The current application claims priority to co-pending provisional application Ser. No. 60/324,842, filed on Sep. 25, 2001 and incorporated herein by reference.

BACKGROUND OF THE INVENTION

1. Technical Field

The present invention relates generally to reciprocating electromagnetic devices, and more particularly to a construction of a reciprocating electromagnetic device for reducing secondary losses in magnetically-permeable elements.

2. Related Art

Direct conversion of AC electric power into reciprocating mechanical power by resonant motors (and the reverse conversion in alternators) has become important in applications like pulse-tube and Stirling-cycle cryocoolers and small externally-heated engine-generators operating on a thermoacoustic or Stirling cycle. As with rotary motors and alternators, these devices typically include a moving field (permanent or electromagnet) interacting with a fixed field, typically electrically-conductive windings around magnetically-permeable structure. Alternatively, both fields may be fixed in space, but variably coupled by a moving magnetically-permeable material bridge (such machines are often called 'variable-reluctance' devices).

Unlike more common rotary motors, the moving parts in such devices reciprocate, typically along the central axis of the assembly. Such reciprocation causes three-dimensional changes in the magnetic flux fields directed through and around the magnetically-permeable structure (typically iron-based). Magnetic permeability is always associated with electrical conductivity in continuous (homogeneous) materials. Such conductivity gives rise to losses called eddy currents, by acting as closed, conductive circuits around changing magnetic flux vectors.

In rotary practice, the 'iron' (so called even when the element iron is not the primary constituent) is built up from layered laminations of thin sheet material to form the intended shape, where each lamination is in a plane perpendicular to the rotation axis. Generally, except near the ends, rotary motors are cylindrical and generally axisymmetric, so that there is no axial gradient of magnetic potential to drive magnetic flux out of a transverse plane like that occupied by the iron laminates. Very little eddy current is generated in such conditions, where field vectors are confined to lie in laminar planes separated by non-conductive coatings.

In many reciprocating machines, for example U.S. Pat. No. 4,602,174 to Redlich or U.S. Pat. No. 4,349,757 to Bhate, an iron path is constructed from axial (radial) or pseudo-radial laminates. Although this approach generally aligns the laminate orientation to the magnetic flux vectors, it is costly and requires special manufacturing processes and equipment not shared with more common rotary machines. Such axially-laminated structures are also not well adapted to mechanical load-bearing, attachment to other structures, or thermal stability in operation.

Another approach to reciprocating devices is taught by U.S. Pat. No. 5,146,123 to Yarr et al. and later adopted in a variation by Nasar in U.S. Pat. No. 5,654,596. In these devices, the standard axially-stacked or layered laminations typical of common rotary motors are used to minimize manufacturing cost. In Yarr et al., special provision is made in shaping the pole tip regions to reduce magnetic flux intensity there and thereby minimize the adverse effects of magnetic flux vectors perpendicular to the electrically-conductive laminations there. No such provisions are made in Nasar, which implies either a higher loss or a lower magnetic flux density throughout, and associated larger mass and cost. In both cases, the magnetic flux is largely confined to laminate planes in most of the device, far from the active magnetic interface between moving and stationary parts. Unfortunately, the losses in the pole area can dominate the total loss inventory, especially at higher frequencies.

Some recent work (e.g., U.S. Pat. Nos. 5,198,137, 5,306,524 and 5,543,174) has been directed towards developing composite materials comprising small, closely-packed particles of conductive, magnetically-permeable material, electrically insulated by a matrix of organic binders. At present, these insulated composites are very costly and such materials exhibit lower total permeability and magnetic saturation levels. This implies larger structures with longer coil pathways that raise the resistive loss in the electrical circuits. Still, they can be molded to shapes that cannot be laminated easily, and they carry magnetic flux in any direction without high eddy current losses because there are no large-scale conductive pathways in the material. As a result, they have been applied as replacements for laminates in reciprocating electromagnetic dynamic devices where the cost, size, and resistance penalties were acceptable, as for instance, in low-power, specialty motors or high-frequency inductors and chokes.

In view of the foregoing, there is a need in the art for an electromagnetic device that provides many of the performance benefits of the more costly axial laminations or insulated composite iron in a reciprocating machine, but with the economical construction of a layered laminate for compatibility with rotary manufacturing practice.

SUMMARY OF THE INVENTION

A first aspect of the invention is directed to an electromagnetic device having a moving element, a stationary element including magnetically permeable laminate layers, and a region subject to a changing magnetic flux component substantially perpendicular to the laminate layers, the device comprising: at least one interruption of an electrically-conductive path within a laminate layer in the region.

A second aspect of the invention is directed to an electromagnetic device having a moving element and a stationary element including magnetically permeable laminate layers, and a region subject to a changing magnetic flux component substantially perpendicular to the laminate layers, the device comprising: means for magnetically interfacing the moving element and the stationary element to minimize local magnetic flux density; and means for interrupting an electrically-conductive path within a laminate layer in the region.

A third aspect of the invention includes a method of reducing eddy-current losses in a region of three-dimensional magnetic flux orientation in an electromagnetic device having a moving element and a stationary element including layered laminates of magnetically-permeable material, the method comprising the steps of: shaping a pole interface between the moving element and the stationary element of the electromagnetic device to reduce local magnetic flux density; and providing an interruption in electrically-conductive paths in the planes of the laminated layers of the stationary element to reduce eddy currents.

A fourth aspect of the invention is directed to a reciprocating electromagnetic device having a moving element, a stationary element including magnetically permeable laminate layers extending transverse to a reciprocation axis, and a region subject to a changing magnetic flux component substantially perpendicular to the laminate layers, the device comprising: at least one interruption of an electrically-conductive path within the planes of a laminated layer in the region.

A fifth aspect of the invention includes an electromagnetic device having a moving element, a stationary element constructed of a magnetically permeable material, and a region subject to a changing magnetic flux component, the device comprising: at least one interruption of an electrically-conductive path within the magnetically permeable material in the region.

The above aspects provide higher efficiency in economical, high-power electrodynamic reciprocators; lower cost and better mechanical integrity in high-efficiency electrodynamic reciprocators; enablement of many new markets and applications not previously addressable with resonator-type thermoacoustic and Stirling devices, where high efficiency at low cost is required for commercial application; and enablement of complex device geometries that require locally-complex three-dimensional magnetic flux fields, without suffering excessive eddy-current losses.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DESCRIPTION OF THE PREFERRED EMBODIMENTS

In general, the present invention includes An electromagnetic device having a moving element, a stationary element including magnetically permeable laminate layers, and a region subject to a changing magnetic flux component substantially perpendicular to the laminate layers, the device comprising: at least one interruption of an electrically-conductive path within a laminate layer in the region. In addition, the invention may include a pole interface between the moving element and the stationary element where the pole interface is shaped to locally reduce magnetic flux density. The interruption acts to reduce eddy-current losses in the pole face region by interruption of electrically-conductive paths in the planes of the laminates. Such interruption may be achieved, for instance, either by slotting the laminates in the low-flux-density, adversely-oriented region, or by replacing a part of the laminate in that region with a magnetically-permeable material oriented or constructed to accept the adversely directed magnetic flux with lower eddy-current generation, and directing the magnetic flux into (and out of) the laminates preferentially in alignment with the laminate planes. The stator element may alternatively be formed from axially-oriented laminates (e.g., wound) or from a magnetically permeable composite. In either case, the interruptions are constructed such that the substantially uniform axial thickness of the stator is preserved.

In any electrodynamic machine with time-varying magnetic fields in a magnetically-permeable magnetic circuit and with an associated electrical circuit, there is a possibility of high parasitic losses in the material of the magnetic circuit. Magnetically-permeable materials suitable for such circuits are always electrically-conductive if made in a continuous, homogenous form. Time varying magnetic flux in the electrically-conductive, magnetically-permeable materials gives rise to eddy currents, with the currents circulating in the material, perpendicular to the magnetic flux field.

In reciprocating electrodynamic devices (typically, motors or alternators), permanent magnets are commonly used on or near the moving part(s) to couple the moving and stationary elements of the device in a manner that makes their magnetic flux field a function of reciprocation. Electric windings are also present and the field associated with current in those windings is coupled with the permanent magnets through a magnetic circuit in a magnetically-permeable structure. The reciprocating motion causes changing magnetic flux orientations where field vectors are not aligned with the reciprocation axis or transverse planes of the layered laminates, resulting in losses due to eddy currents in structures with axially-stacked laminates (as commonly used in rotary motors).

Figure 1:
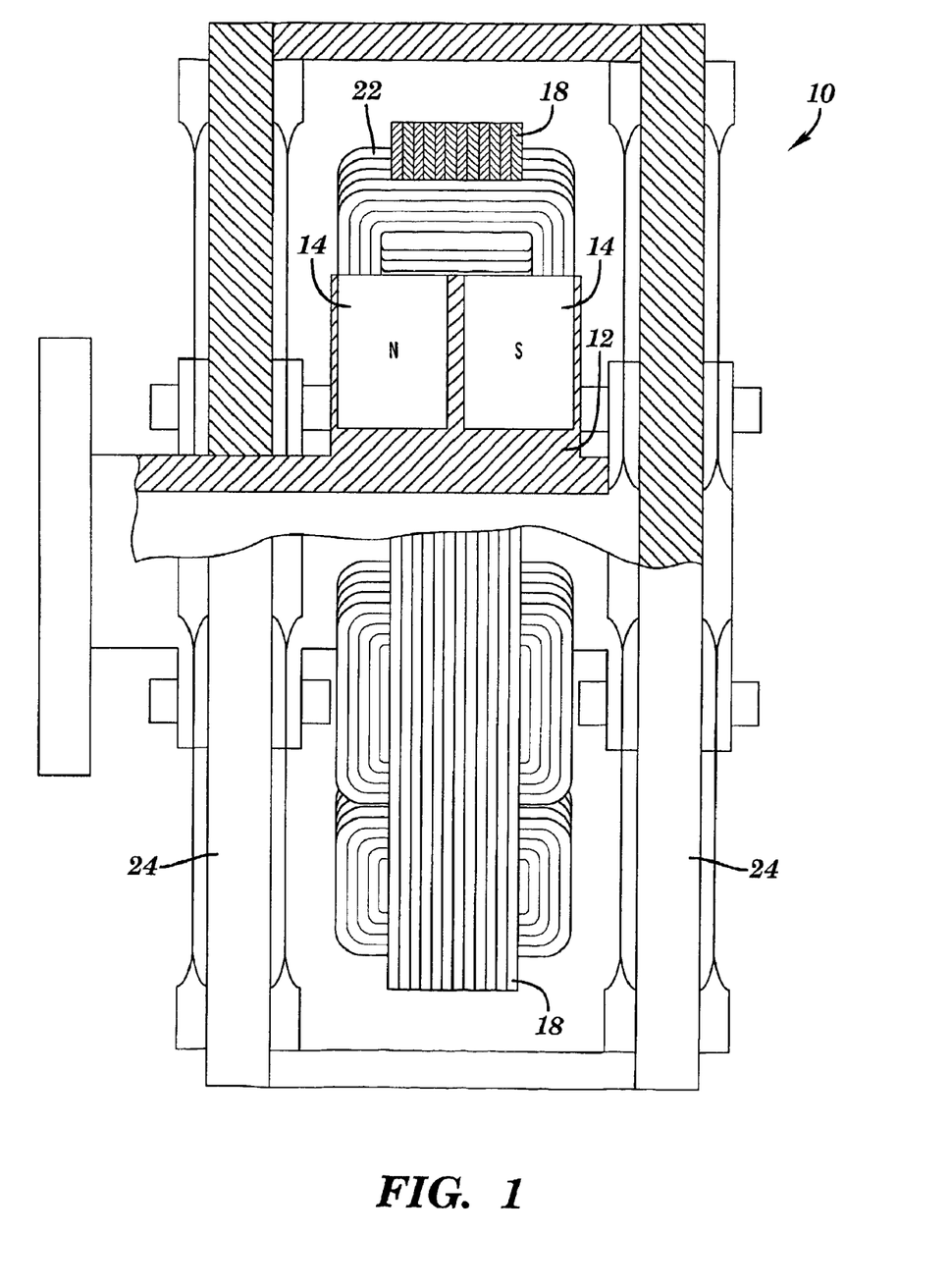
FIG. 1 shows a reciprocating electrodynamic device utilizing the present invention.
Figure 2:
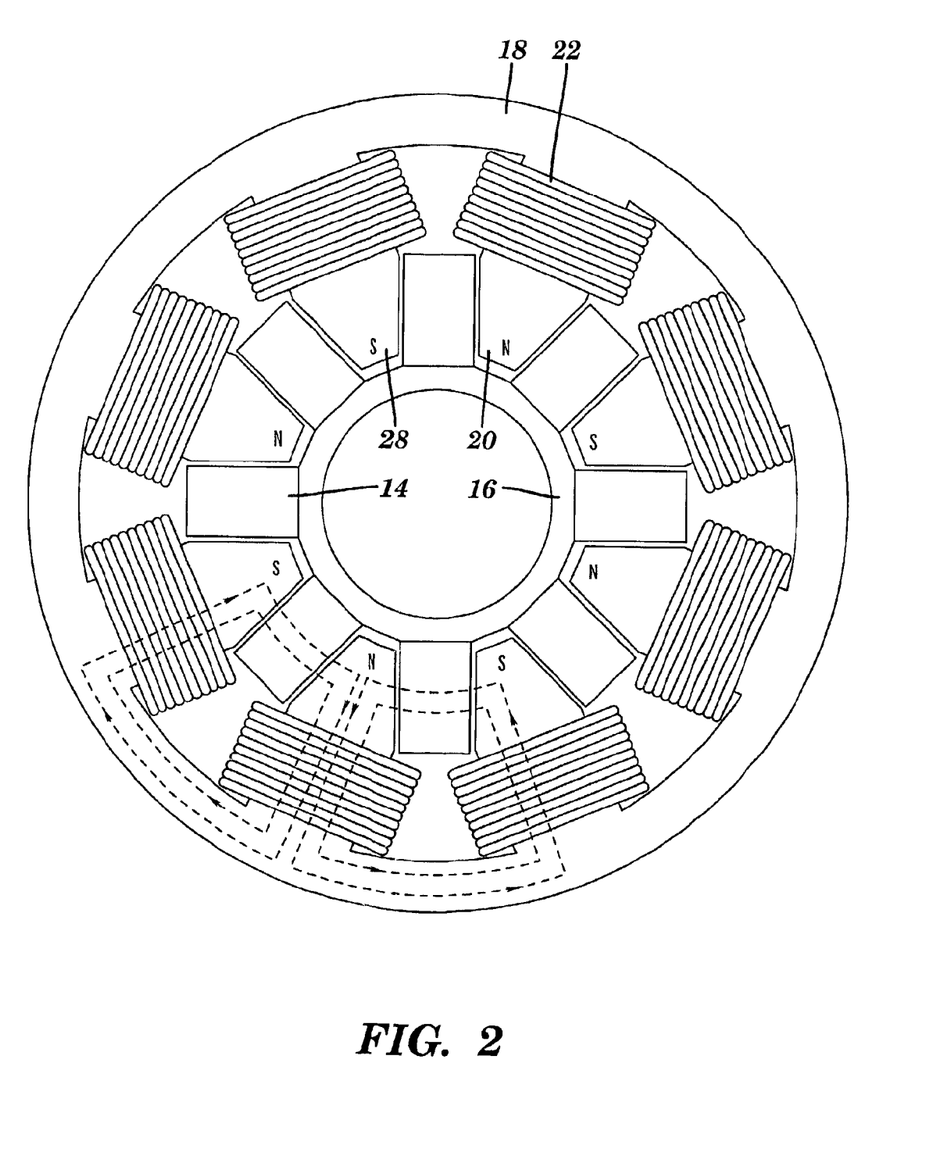
FIG. 2 shows a cross-sectional view of a moving element and a stationary element of the device of FIG. 1.
Figure 3:
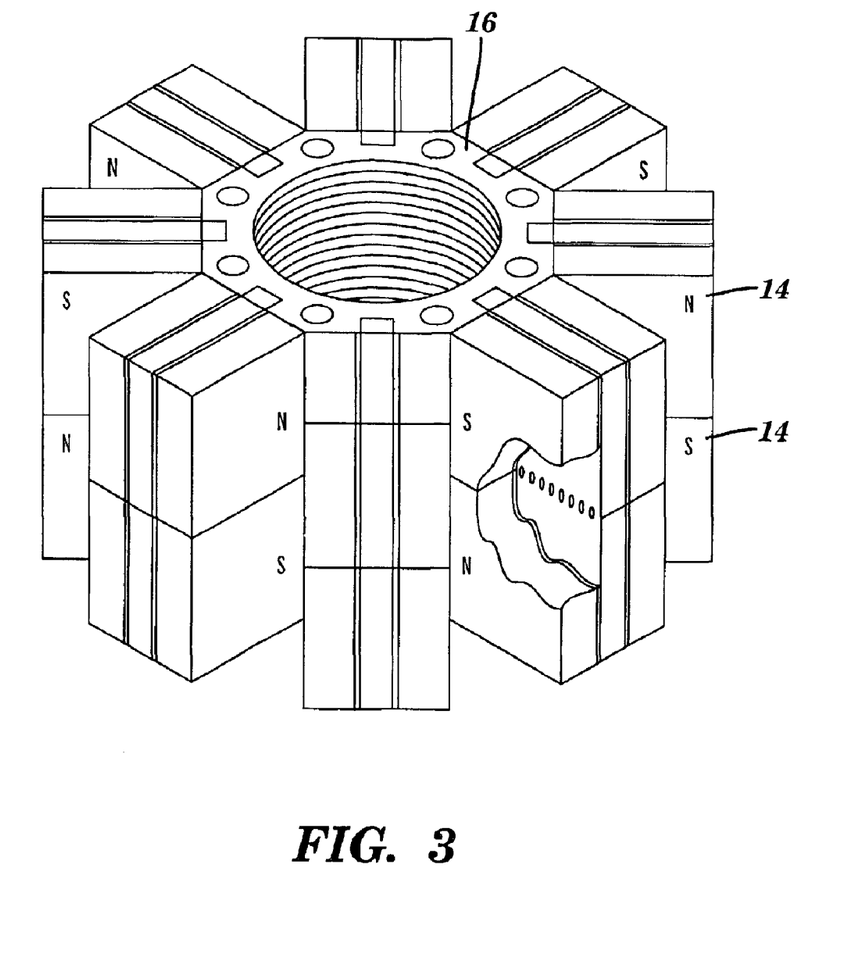
FIG. 3 is a perspective view of a magnetic portion of the moving element.
Figure 4:
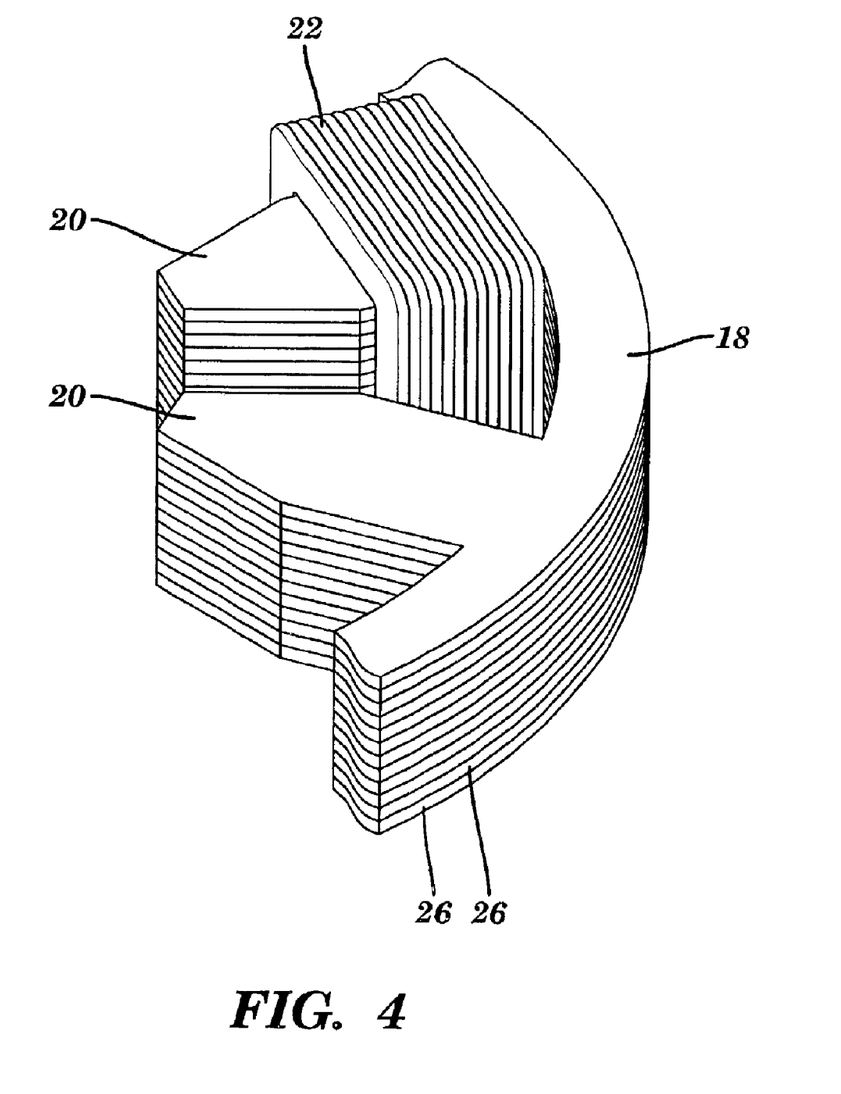
FIG. 4 is partial perspective view of layered laminates of the stationary element.

Referring to FIGS. 1–4, a reciprocating electrodynamic device 10 may include a moving element 12 comprising permanent magnets 14 arrayed about a hub 16; and a magnetically-permeable stationary element 18 with radially-oriented poles 20, each with a coil of electrical windings 22. A suspension system 24 may also be provided to allow relative reciprocation without rubbing contact, rotation or other undesired movement. As illustrated in FIG. 2, the moving element magnets 14 interdigitate with poles 20 of the stationary element (i.e., stator). In addition, the stationary element is constructed of layers of magnetically permeable laminate 26.

Figure 5:
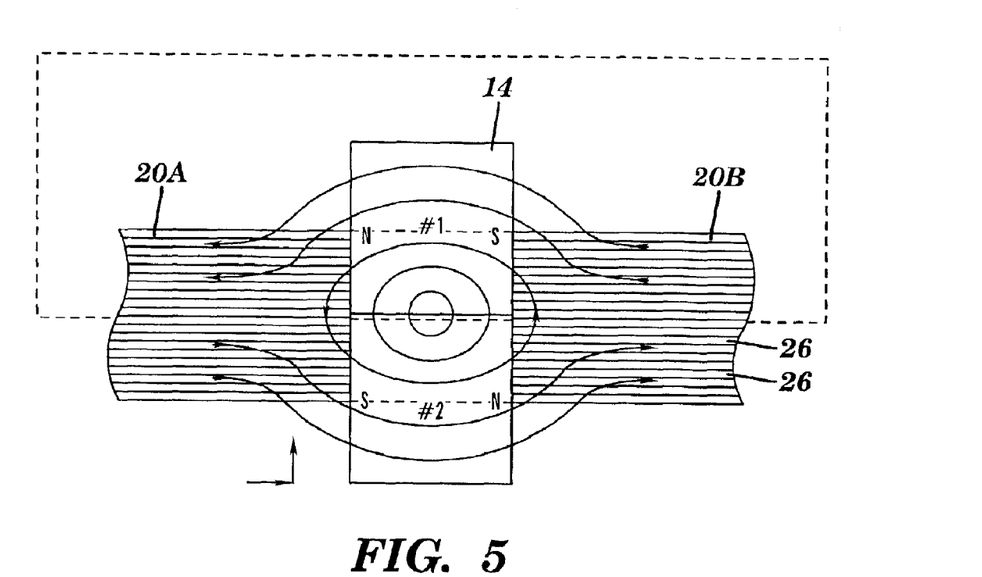
FIG. 5 shows magnetic flux field orientations at a pole interface between the moving element and stationary element at mid-stroke.
Figure 6:
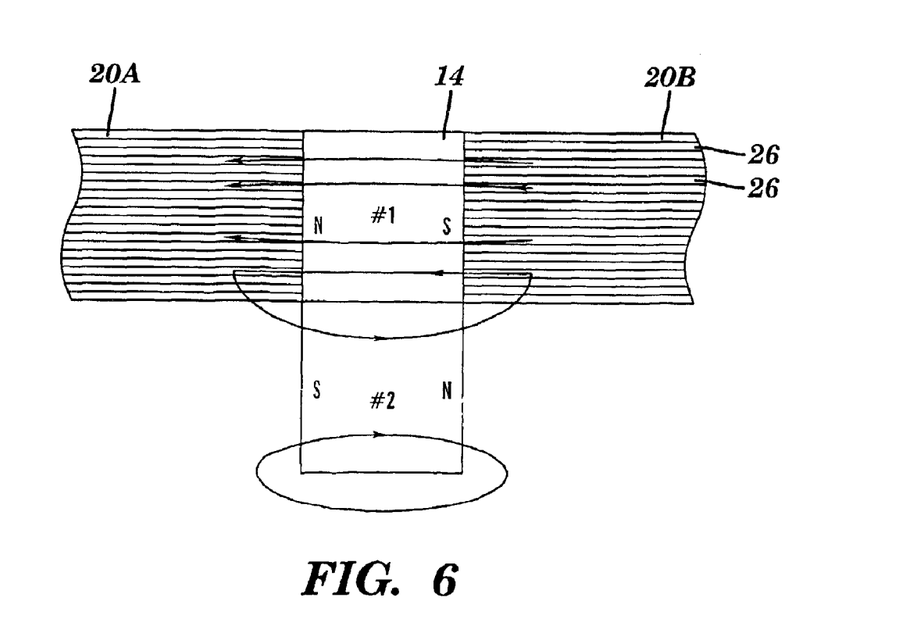
FIG. 6 shows magnetic flux field orientations at a pole interface between the moving element and stationary element at full stroke.
Figure 7:
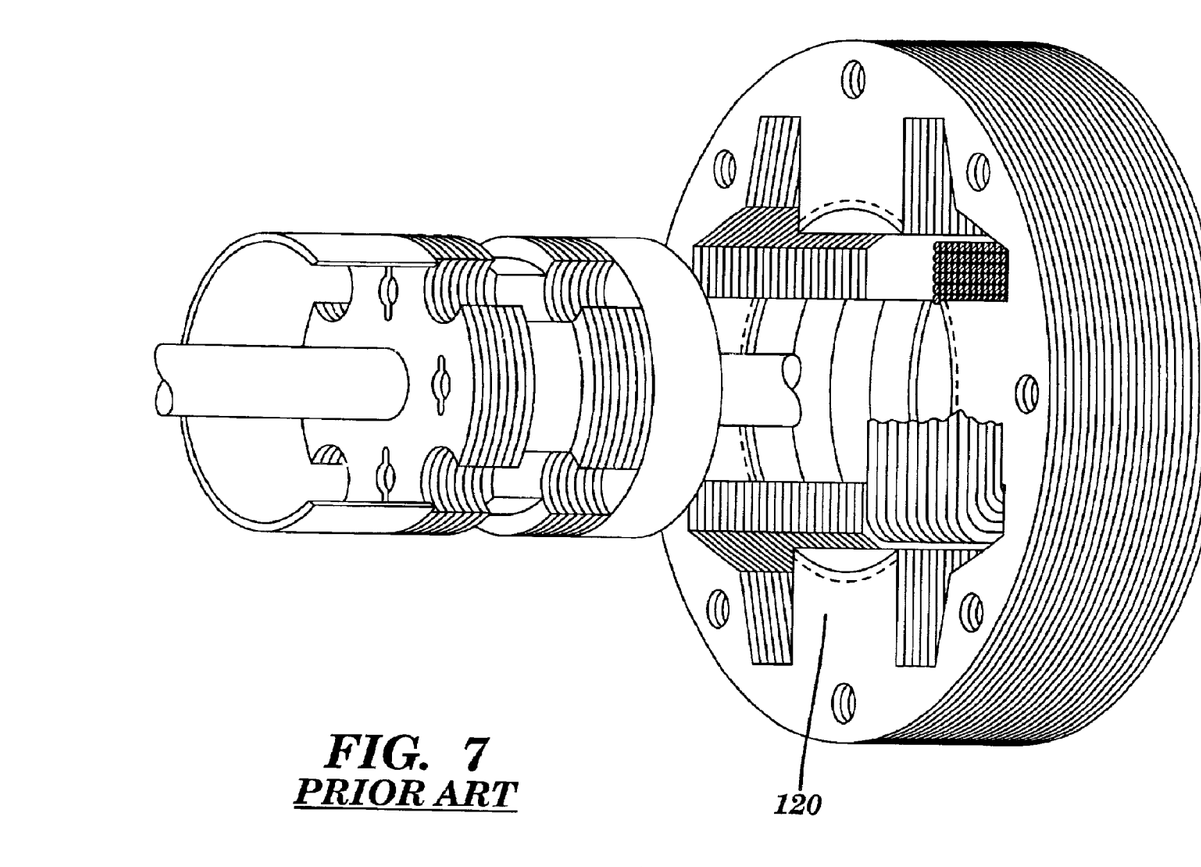
FIG. 7 shows an alternative prior art reciprocating electromagnetic device in which the magnets are on the stationary element.

Referring to FIGS. 5 and 6, we can see from a cross-section through one magnet and adjacent poles 20A, 20B, that the magnetic flux field has a substantial component perpendicular to the layered laminates 26 of the poles 20, at least in the region near the 'pole tips'. This region will be referred to as a 'pole interface' between the moving element and stationary element. Referring to FIG. 7, such adverse misalignment between the magnetic flux and the layered laminate is not restricted to devices of the example shown in FIGS. 1–6, but is common to some other kinds reciprocating devices. For example, FIG. 7 illustrates a magnetic flux field in the device of U.S. Pat. No. 5,654,596 to Nasar, which is hereby incorporated by reference. In this device, the magnets are on the stationary element 120 and the magnetic flux coupling is switched by moving iron that alternately aligns with magnet zones of opposing polarity, completing magnetically-permeable paths to carry alternately-directed flux that then couples with electrically-conductive coils. Compare this fixed-magnet, moving iron-path approach ("flux switching") with moving-magnet, fixed path machines ("flux reversing").

Figure 8:
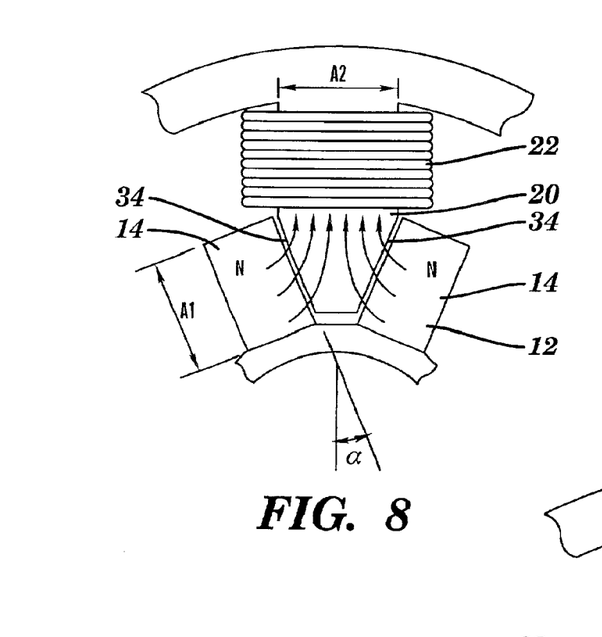
FIG. 8 shows electrically-conductive paths in the planes of laminated layers of a stationary element of the device of FIG. 1.

FIG. 8 shows the desirable, in-lamination portion of the magnetic flux field at the pole interface between moving element 12 and stationary element 20 of the device of FIG. 1. Any interruptions in the magnetically-permeable material parallel to this field (illustrated as lines) will have no substantial negative effect on the field, so long as the reduction of material area by the interruptions does not increase the magnetic flux density in the remaining material above its practical saturation limits.

Figure 9:
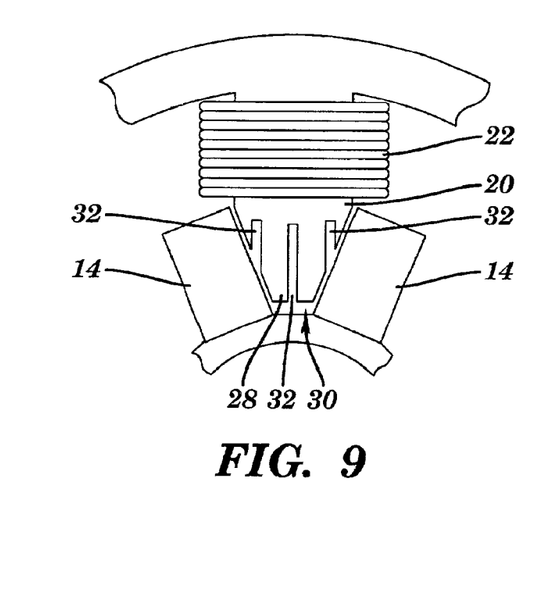
FIG. 9 shows a first embodiment of an interruption for reducing eddy currents in the device of FIG. 1 in accordance with the invention.

According to a first embodiment of the invention shown in FIG. 9, the lower-flux density pole tip region 28 of the device includes one or more interruptions. By "interruptions" is meant a discontinuity in the local electrical conductance of the magnetically-permeable material. One way of providing interruptions is by placing voids 30 in the pole 20. One mechanism for providing these voids 30 is by placing one or more slots 32 in the pole 20. Slots 32 preferably are substantially perpendicular to the laminations (themselves perpendicular to the reciprocation axis), and substantially aligned to the desired magnetic flux paths through the slotted part of the layered laminates. Of course, other voids 30 may be implemented depending on the desired routing of magnetic flux in the layered laminates. The reduction in eddy current losses have been calculated, based on some simplifying assumptions. In particular, the drag force resulting from eddy currents in the roughly-triangular pole tips 20 of a transversely laminated stator, as shown in FIG. 1, can be estimated from a simplified formula, assuming the flux is uniform throughout the pole tip and has the magnitude of the imposed flux at the pole faces. Using these assumptions, we have:

$F_{drag}$/pole=(Peak Magnetic Flux Density at the pole faces)$^2$*(electrically-conductive end-surface area of the pole)$^2$*(number of electrically-conductive areas in pole tip) *(peak velocity of the moving magnet)*(axial length of pole tip face/resistivity of the pole material).

It can be seen that interrupting the conductive area once (e.g., cutting it in half, making two smaller areas) will reduce the loss by a factor of two. The new conductive areas will be one half the size of the original, and area is squared (total factor ¼). Since the number of areas is a linear part of the loss formula, two areas of half-size make a factor of 2 times the ¼ size factor. There is a net loss factor of ²⁄₄ or ½, compared to the single-area loss.

Another aspect of the present invention is the shaping of a pole interface (interface between moving and static parts) to locally reduce magnetic flux density relative to that maximum allowable in the material. This is done, for example, by extending the pole tips to a substantial point, as shown in FIG. 8, with an included angle α to create pole faces 34, each having a face area (indicating by linear dimension A1 in FIG. 8), on each flank of the pole tip. The pole tip face areas are greater than the base pole area (indicated by linear dimension A2 in FIG. 8), so flux density at the faces 34 is lower than in the main pole section by factor equivalent to the face area divided by base pole area (A2/A1). Shaping may be of the pole 20 and/or moving element 12, e.g., magnets 14 if the device provides the magnets on the moving element.

Figure 10:
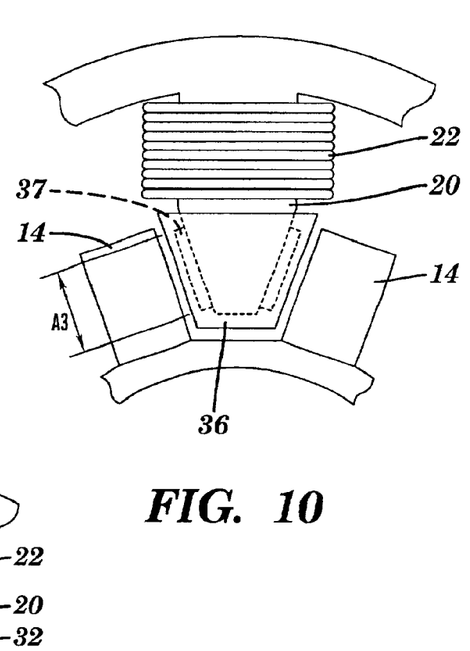
FIG. 10 shows a second embodiment of an interruption for reducing eddy currents in the device of FIG. 1 in accordance with the invention.

Referring to FIG. 10, according to a second embodiment of the invention, the pole tip region where magnetic flux is not aligned well to the laminations and where magnetic flux density may be held lower than otherwise desirable in other parts of the stationary element (e.g., under the coils, to minimize resistive loss and iron mass), is replaced by a separate piece, formed from an insulated magnetically-permeable composite part 36 to provide an interruption. Such materials consist of small particles of iron or other magnetically-permeable material, separated and bonded by an electrically-insulating material, typically a polymer. An example is ANCORSTEEL by Hogaenes Corp. FIG. 10 shows such an adaptation on the device of FIG. 1, in which the formed composite part 36 also serves as a retainer for coil/winding 22. The interface between the insulated part and the laminations is sized and shaped into a keyed contact 37 that locates composite part 36 on the laminates of pole 20 and provides a transition area (indicated by linear dimension A3 in FIG. 10) less than the pole face areas (A1 in FIG. 8) but greater than the base pole area (A2 in FIG. 8). The transition area A3 corresponds to the lesser saturation capacity of the composite relative to the laminate (in ratio A2/A3). This structure guides magnetic flux into the laminations with minimal misalignment and with low enough density to avoid saturation of the part.

Figure 11:
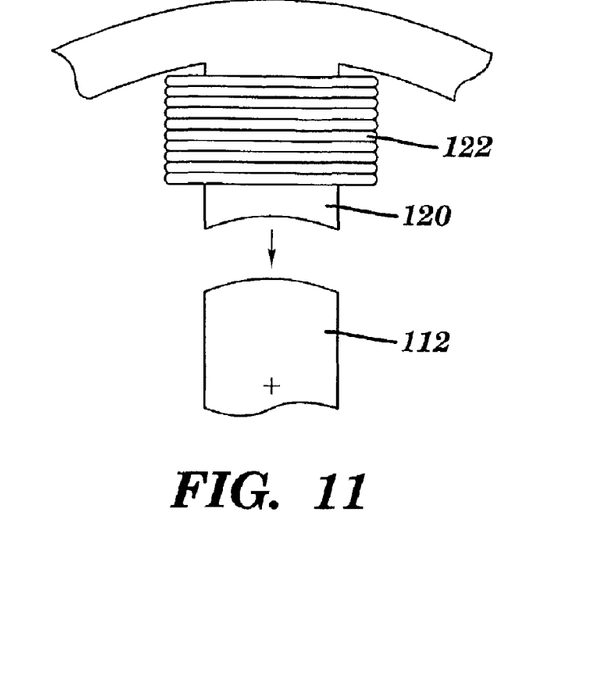
FIG. 11 shows a detail of the device of FIG. 7.
Figure 12:
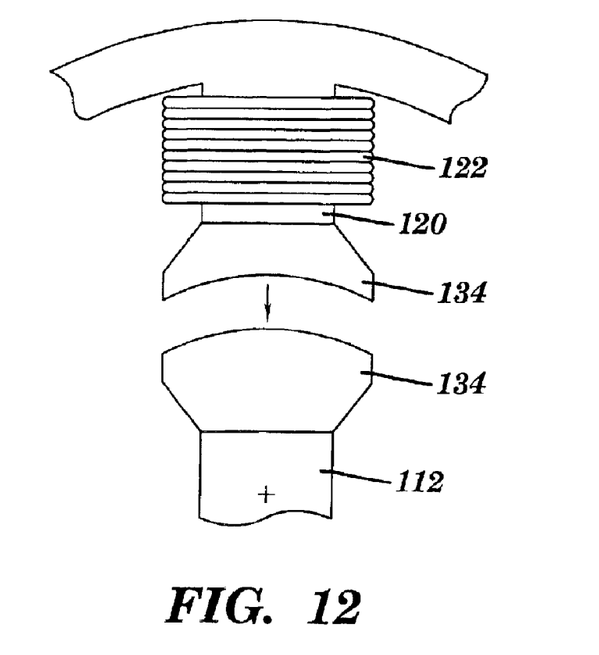
FIG. 12 shows implementation of the second embodiment of an interruption with the device of FIG. 7.

Referring to FIGS. 11 and 12, a detail of the device of FIG. 7 including a moving element 112 and a stationary element 120 having coil windings 122 is shown. FIG. 12 shows this device with an implementation of the second embodiment in which two insulated magnetically-permeable composite parts 134 are provided, one on the stationary element 120 and one on the moving element 112. The parts are shaped to reduce local flux density.

Figure 13:
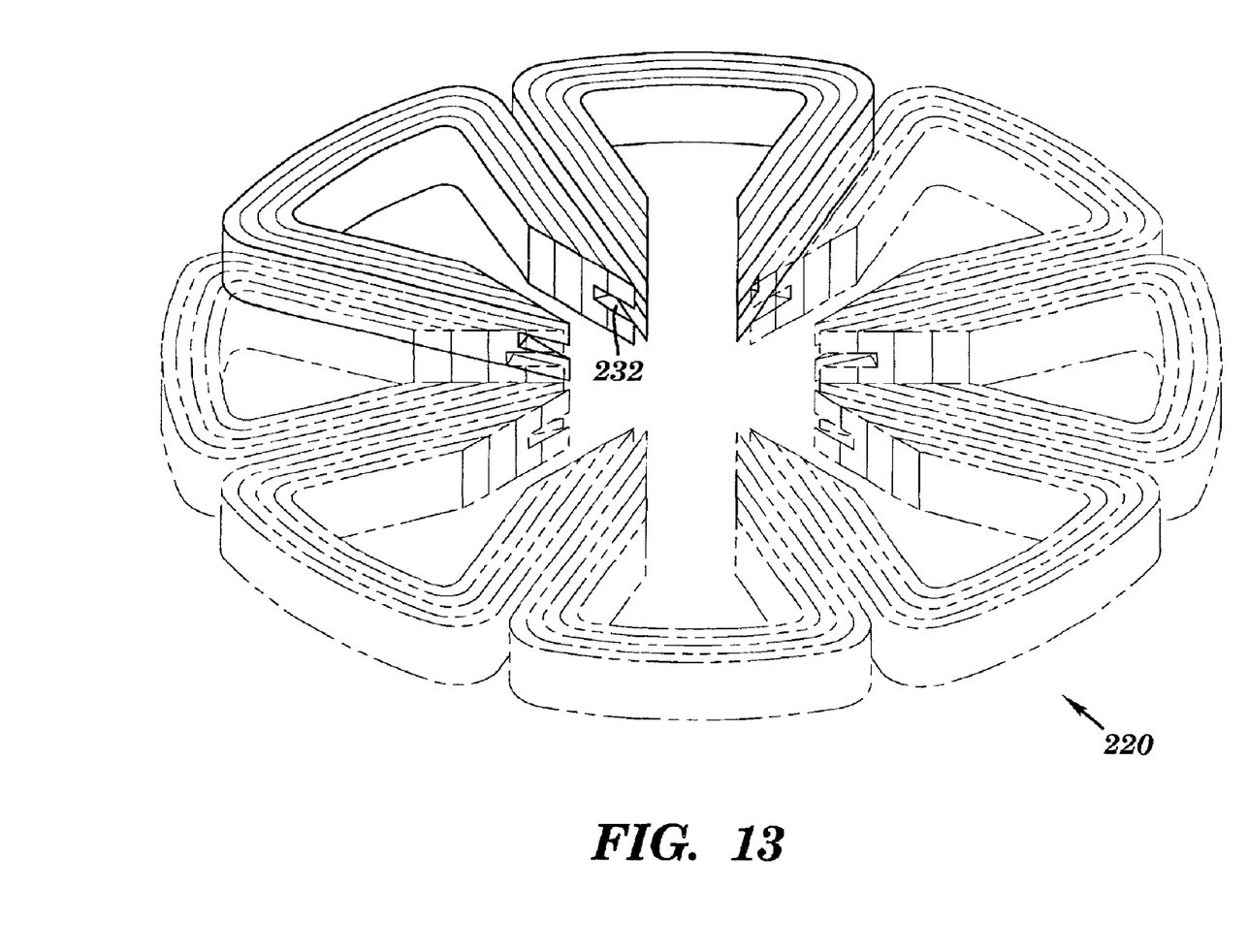
FIG. 13 shows a third embodiment of an interruption for reducing eddy currents in a reciprocating device having a wound stator of generally the same form as the device of FIG. 1.
Figure 14A:
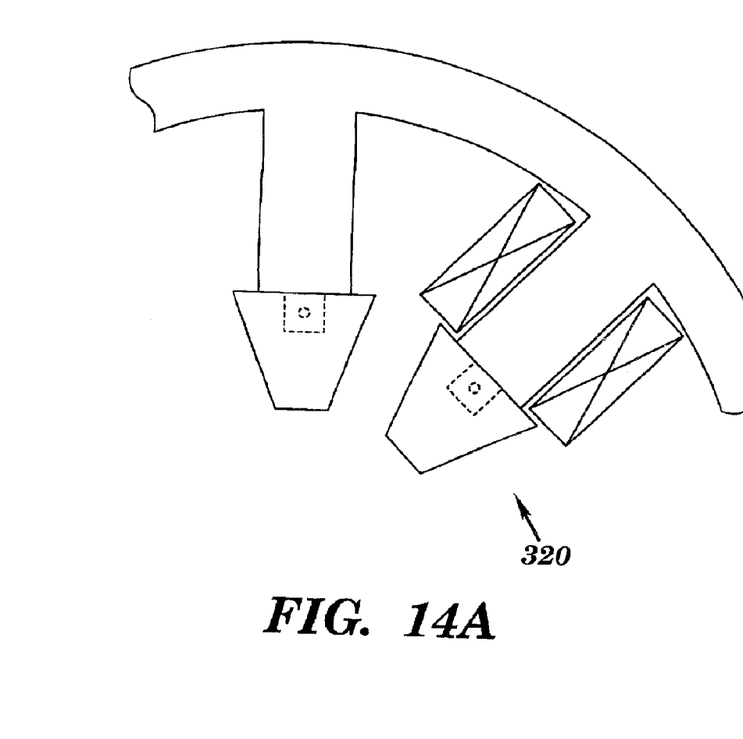
FIG. 14 shows a fourth embodiment of an interruption in an electromagnetic device having a stator made of a composite material.
Figure 14B:
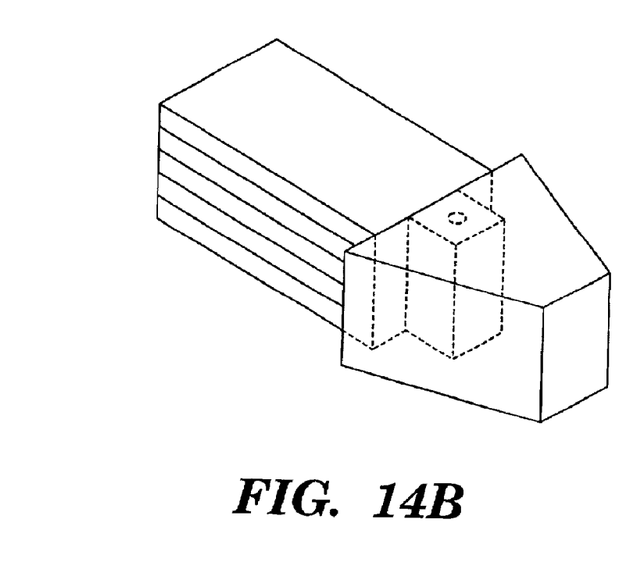

Turning to FIGS. 13 and 14, FIG. 13 shows a stationary element 220 for an electromagnetic device made from a magnetically permeable wound material and incorporating interruptions in accordance with the invention. In this case, the interruptions are in the form of slots 232 that extend transverse to the wound material. FIG. 14 shows a stationary element 320 for an electromagnetic device made from a magnetically permeable composite material and intrinsically incorporating interruptions in accordance with the invention. FIGS. 13 and 14 exemplify how the teachings of the invention are not limited to reciprocating devices, stationary elements having laminates or laminates that extend perpendicular to a reciprocation axis.

The present invention reduces the required pole area and winding length (around the pole areas) without incurring added eddy current losses in the interface region. The present invention also provides an improvement in the performance/cost ratio for reciprocating electrodynamic devices. As a result, the invention may provide higher efficiency in economical, high-power electrodynamic reciprocators; lower cost and better mechanical integrity in high-efficiency electrodynamic reciprocators; enablement of many new markets and applications not previously addressable with resonator-type thermoacoustic and Stirling devices, where high efficiency at low cost is required for commercial application; and enablement of complex device geometries that require locally-complex three-dimensional magnetic flux fields, without suffering excessive eddy-current losses or the higher resistive losses and cost implied by use of lower capacity composite material throughout. The teachings of the invention can be applied to any electrodynamic device at critical points with lower flux density, in combination with ordinary laminates elsewhere as needed for higher flux and lower cost.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An electromagnetic device having a linear moving element, a stationary element including magnetically permeable laminate layers, and a region subject to a changing magnetic flux component substantially perpendicular to the laminate layers, the device comprising:

at least one interruption of an electrically-conductive path within a laminate layer in the region.

2. The device of claim 1, further comprising a pole interface between the linear moving element and the stationary element, the pole interface shaped to locally reduce magnetic flux density.

3. The device of claim 1, wherein the at least one interruption is at least one slot placed in the laminated layers.

4. The device of claim 3, wherein the at least one slot runs perpendicular to a planar surface of each laminate layer.

5. The device of claim 1, wherein the at least one interruption directs magnetic flux into and out of the laminate layers.

6. The device of claim 1, wherein the at least one interruption directs magnetic flux in alignment with a plane of the laminate layers.

7. The device of claim 1, wherein the at least one interruption is bordered by or contained in a magnetically-permeable structure capable of accepting adversely directed magnetic flux.

8. The device of claim 1, wherein the linear moving element is driven by electric current flowing through the stationary element.

9. The device of claim 1, wherein motion of the linear moving element causes electric current to flow in the stationary element.

10. The device of claim 1, wherein the device is a reciprocating device and the laminate layers extend transverse to a reciprocating axis.

11. An electromagnetic device having a linear moving element and a stationary element including magnetically permeable laminate layer, and a region subject to a changing magnetic flux component substantially perpendicular to the laminate layers, the device comprising:

means for magnetically interfacing the linear moving element and the stationary element to minimize local magnetic flux density; and means for interrupting an electrically-conductive path within a laminate layer in the region.

12. A method of reducing eddy-current losses in a region of three-dimensional magnetic flux orientation in an electromagnetic device having a linear moving element and a stationary element including layered laminates of magnetically-permeable material, the method comprising the steps of:

shaping a pole interface between the linear moving element and the stationary element of the electromagnetic device to reduce local magnetic flux density; and providing an interruption in electrically-conductive paths in the planes of the laminated layers of the stationary element to reduce eddy currents.

13. The method of claim 12, wherein the step of providing an interruption is provided by placing a void in the layered laminates of the stationary element.

14. The method of claim 13, wherein the void is at least one slot.

15. The method of claim 14, wherein the at least one slot runs perpendicular to a planar surface of each laminate layer.

16. The method of claim 12, wherein the step of providing an interruption is provided by placing an insulated composite between the linear moving element and the stationary element.

17. A reciprocating electromagnetic device having a linear moving element, a stationary element including magnetically permeable laminate layers extending transverse to a reciprocation axis, and a region subject to a changing magnetic flux component substantially perpendicular to the laminate layers, the device comprising:

at least one interruption of an electrically-conductive path within the planes of a laminated layer in the region.

18. The device of claim 17, further comprising a pole interface between the linear moving element and the stationary element, the pole interface shaped to locally reduce magnetic flux density.

19. The device of claim 17, wherein the at least one interruption is at least one slot placed in the laminated layers.

20. The device of claim 19, wherein the at least one slot runs perpendicular to a planar surface of each laminate layer.

21. The device of claim 17, wherein the at least one interruption directs magnetic flux into and out of the laminate layers.

22. The device of claim 17, wherein the at least one interruption directs magnetic flux in alignment with a plane of the laminate layers.

23. The device of claim 17, wherein the at least one interruption is a magnetically-permeable structure capable of accepting adversely directed magnetic flux.

24. The device of claim 17, wherein the linear moving element is driven by electric current flowing through the stationary element.

25. The device of claim 17, wherein motion of the linear moving element causes electric current to flow in the stationary element.

26. An electromagnetic device having a linear moving element, a stationary element constructed of a magnetically permeable material, and a region subject to a changing three-dimensional magnetic flux component, the device comprising:

at least one interruption of an electrically-conductive path within the magnetically permeable material in the region.

27. The device of claim 26, wherein the magnetically permeable material is a composite material.

28. The device of claim 26, wherein the device is a reciprocating device and the magnetically permeable material is constructed of a wound material.

* * * * *

UNITED STATES PATENT AND TRADEMARK OFFICE
CERTIFICATE OF CORRECTION

| | |
|---|---|
| PATENT NO. | : 6,927,506 B2 |
| DATED | : August 9, 2005 |
| INVENTOR(S) | : John A. Corey |

It is certified that error appears in the above-identified patent and that said Letters Patent is hereby corrected as shown below:

Column 7,
Line 41, please take out the word "Layer" and insert -- layers --.

Signed and Sealed this

Sixth Day of December, 2005

JON W. DUDAS
*Director of the United States Patent and Trademark Office*